United States Patent [19]

Hannah

[11] Patent Number: 5,550,595
[45] Date of Patent: Aug. 27, 1996

[54] APPARATUS AND METHOD FOR MOTION ESTIMATION WITH ENHANCED CAMERA INTERFACE

[75] Inventor: Eric C. Hannah, Pebble Beach, Calif.

[73] Assignee: Intel Corporation, Santa Clara, Calif.

[21] Appl. No.: 357,389

[22] Filed: Dec. 16, 1994

[51] Int. Cl.⁶ .............................. H04N 7/24; H04N 7/32; H04N 5/765
[52] U.S. Cl. ..................... 348/552; 348/384; 348/222; 348/229; 348/364; 348/371
[58] Field of Search ..................... 348/552, 409, 348/415, 416, 384, 207, 229, 222, 221, 362, 364, 371; H04N 7/24, 7/32, 5/765

[56] References Cited

U.S. PATENT DOCUMENTS

| | | | |
|---|---|---|---|
| 4,849,810 | 7/1989 | Ericsson | 358/135 |
| 5,016,107 | 5/1991 | Sasson et al. | 348/384 |
| 5,019,901 | 5/1991 | Uomori et al. | 358/105 |
| 5,126,841 | 6/1992 | Tanaka et al. | 358/105 |
| 5,150,209 | 9/1992 | Baker | 358/135 |
| 5,151,784 | 9/1992 | Lavagetto et al. | 358/136 |
| 5,173,773 | 12/1992 | Ueda et al. | 358/136 |
| 5,198,901 | 3/1994 | Lynch | 358/138 |
| 5,251,028 | 10/1993 | Iu | 358/133 |
| 5,329,318 | 7/1994 | Keith | 348/699 |
| 5,414,464 | 5/1995 | Sasaki | 348/222 |
| 5,416,520 | 5/1995 | Kuzma | 348/409 |
| 5,436,666 | 7/1995 | Astle | 348/416 |

*Primary Examiner*—Safet Metjahic
*Assistant Examiner*—Glenton B. Burgess
*Attorney, Agent, or Firm*—William H. Murray; N. Stephan Kinsella

[57] ABSTRACT

A method and apparatus for processing video signals. According to a preferred embodiment, a video processor is provided, and a video camera interfaced with with the video processor is provided. The video camera supplies video frames to the video processor, and comprises an automatic exposure setting mechanism for automatically updating at least one video exposure parameter before transmitting a next video frame to the video processor. The video camera enables or disables the automatic exposure setting mechanism in response to a strobe signal. It is determined whether to intra-frame encode or to difference encode the next video frame. The video processor transmits a strobe signal to the video camera in accordance with this determination to control the automatic exposure setting mechanism of the video camera.

28 Claims, 2 Drawing Sheets

APPARATUS AND METHOD FOR MOTION ESTIMATION WITH ENHANCED CAMERA INTERFACE

BACKGROUND OF THE INVENTION

1. Field of the Invention

The present invention relates to signal processing and, in particular, to computer-implemented processes and apparatuses for performing motion estimation with an enhanced camera interface.

2. Description of the Related Art

Motion estimation is commonly utilized by video encoders in signal processing techniques that compress successive frames of video data ("video frames"). For example, a plurality of video frames, each represented by a bitstream, may represent successive images of a motion video. When these video frames are to be transmitted via a communication medium of limited bandwidth, or are to be stored in a storage medium having limited storage capacity, it is often desirable to first compress the data contained in the bitstreams.

Motion estimation is one of the most computationally intense of the various techniques utilized to compress data. Motion estimation techniques exploit the temporal correlation that often exists between consecutive video frames, in which there is a tendency of some objects or image features to move within restricted boundaries from one location to another from frame to frame.

For instance, frame 1 may contain an object, and frame 2 may contain an identical set of pixels corresponding to the object spatially displaced by a few pixels from the location of the same set of pixels in frame 1. If frame 1 is transmitted a video processor to a remote pixel processor or video processor (which performs any necessary decompression or other decoding), frame 2 may be transmitted without the pixels corresponding to the object. Instead, information such as motion vectors or pointers is sent along with frame 2 (which may also be compressed using other techniques). These motion vectors may be utilized by the remote receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in Frame 2.

The motion estimation procedure may be performed at the encoder level by comparing given regions or blocks within a current video frame to many regions or blocks within the previous video frame. The process of comparing a given block of one frame to blocks of another frame to find a sufficiently similar match is often called "block matching," and the process of comparing one frame against another in this manner is often called "frame differencing." Frame differencing and block matching are thus essential elements of the motion estimation procedure. Blocks are matched by determining a "difference measurement" between any given pair of blocks. A difference measurement corresponds to the overall degree of difference of the two regions. If the difference measurement is below a predetermined threshold, the blocks are considered to be similar enough that a block match is indicated. If so, the block in the previous video frame may be utilized as described above by the video decoder to reproduce the same block in the current video frame.

The video frames which are to be encoded via motion estimation are typically received from a video camera. When analog video cameras are used that produce analog video signals, the signals are digitized and converted to digital pixel data. Digital video cameras with charge-coupled devices (CCDs) may also be utilized which directly generate digital data representing video frames that may be provided to a video processor. Theoretically, still background areas of a video sequence should have zero difference from one frame to the next. However, it has been observed that there is often a constant "churning" of the pixels that make up the stationary background of a motion video clip in which the video camera is stationary. This can be attributed to at least two factors. First, the signal-to-noise ratio of the video signal digitizer results in least significant bit (LSB) fluctuation of the digitized signal. Second, automatic exposure settings such as the automatic gain control (AGC) built into every NTSC camera cause successive video frames to differ. Other exposure settings include, for example, gamma curves, color balance, automatic focus, automatic wipeout and fade, and zoom capabilities.

The LSB problem may be dealt with by calibrating a compression algorithm to ignore signal fluctuations below a specified noise rejection threshold. However, frame-to-frame pixel fluctuations caused by automatic exposure settings such as AGC still poses a problem to motion estimation techniques. Furthermore, the noise rejection threshold scheme for minimizing the LSB problem may be ineffective because of the fluctuations caused by automatic exposure settings. The reason for this problem is that successive video frames received by a video processor from a video camera may vary in overall exposure characteristics from frame to frame. With AGC, for example, the video camera automatically adjusts the gain of the CCD image sensor to produce the most image detail (best contrast balance) in any given situation. This is a continuous-feedback regulation mechanism which takes place at all times, even where the background and other image features are stationary. While such frame-by-frame automatic exposure settings are not very noticeable to a human viewer, the changes in pixels from frame to frame are very noticeable to a motion estimation technique, and indeed may be interpreted as "motion," thereby preventing blocks from being matched. Alternatively, because non-identical blocks are considered to be "matched" if their difference is below a certain threshold, a higher percentage of block matches that are made may have a higher error level, closer to the threshold. This can cause the reconstructed video frame to have a poorer quality than if better block matches, i.e. those with less difference error, had been found. Thus, although automatic exposure settings improve the quality of individual video frames in some contexts, such automatic exposure settings can reduce the ability of a video processor to efficiently perform motion estimation.

As a concrete example, video frame 1 and video frame 2 may each be nearly-identical, successive images of the face of a person wearing glasses. In video frame 2 the face may have tilted slightly to one side, so that the glasses now reflect the bright glare of a light. Normally, two such similar video frames might have many very similar blocks or features that could allow a high degree of motion estimation-type compression, since the block matching procedure will detect many similar blocks between the two frames. However, the glare in video frame 2 can cause many pixels in video frame 2 to be altered by the video camera before the video processor receives video frame 2.

For example, the glare may trigger the video camera's automatic gain control aspect of the automatic exposure settings to reduce the intensity of each pixel in video frame 2 to lower video frame 2's average brightness. Blocks within the two video frames that represent similar image features, such as eyes, ears, or portions thereof, might not be matched because of the different overall brightness between blocks. Thus, the number of blocks that will be matched is reduced even though many blocks contain almost identical image features, thereby hindering the ability to utilize motion estimation to compress data. Similarly, other automatic exposure adjustments can significantly interfere with the block matching operations performed in motion estimation, because similar features between video frames are more difficult to detect when successive video frames are generated with different exposure settings.

There is thus a need for a video processing system that obtains the advantages of automatic exposure settings without reducing the efficiency of motion estimation procedures.

It is accordingly an object of this invention to overcome the disadvantages and drawbacks of the known art and to provide a computer-implemented process and apparatus for performing motion estimation with an enhanced camera interface.

Further objects and advantages of this invention will become apparent from the detailed description of a preferred embodiment which follows.

SUMMARY

The previously mentioned objectives are fulfilled with the present invention. There is provided herein a method and apparatus for processing video signals. According to a preferred embodiment, a video processor means is provided, and a video camera means interfaced with with the video processor means is provided. The video camera means supplies video frames to the video processor means, and comprises an automatic exposure setting means for automatically updating at least one video exposure parameter before transmitting a next video frame to the video processor means. The video camera means enables or disables the automatic exposure setting means in response to a strobe signal. It is determined whether to intra-frame encode or to difference encode the next video frame. The video processor means transmits a strobe signal to the video camera means in accordance with this determination to control the automatic exposure setting means of the video camera means.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
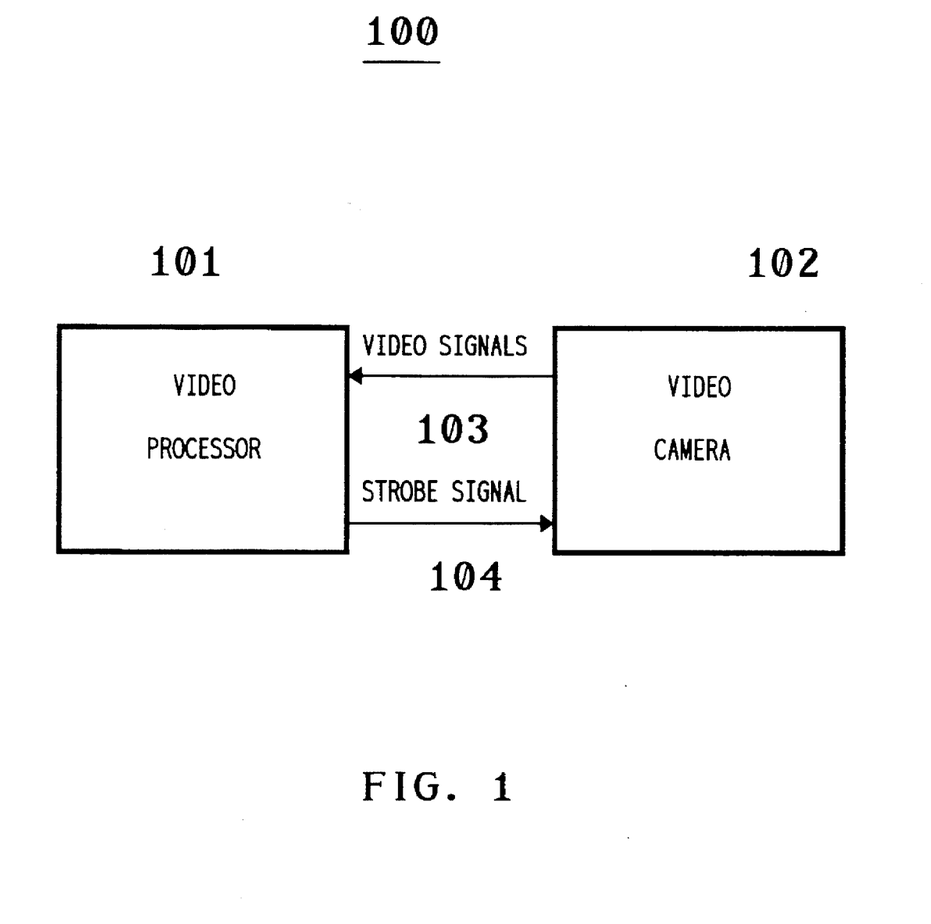
FIG. 1 is a block diagram of a preferred video processing system in accordance with the present invention.

Referring now to FIG. 1, there is shown a block diagram of a preferred video processing system 100 in accordance with the present invention. Video processing system 100 contains video processor 101 and video camera 102, which are connected via video signal line 103 and strobe signal line 104. Video processor 101 may be any suitable processor capable of compressing video images and performing motion estimation, and is preferably an Intel® Video Processor such as 82750PB. Video processor 101 may also be a general-purpose processor such as an Intel® Pentium™ processor. Video camera 102 may be any video camera suitable for generating video signals representative of video frames and capable of performing automatic exposure settings on consecutive video frames. Video camera 102 is also configurable to respond to the strobe signal from video processor 101 in the manner described hereinbelow, and is preferably a digital camera with programmable gain control such as similar cameras currently manufactured by Teleview Research.

During motion estimation techniques, a video frame is compressed by comparing it to a previous video frame, typically the immediately preceding video frame in a motion video clip or sequence. As discussed above, where similar blocks are found in the previous video frame, a motion vector is transmitted instead of the pixels for that block, which allows the block to be reconstructed from the reference block in the previous video frame. A first video frame of a sequence has no previous video frame so is sent without being encoded with motion estimation techniques. Such frames are called "intra-frames" or anchor frames, because the video frame itself contains enough information for the receiving video processor to reconstruct it without referring to a previous video frame. It will be understood that intra-frames, while not encoded with motion estimation techniques, may be encoded with other data compression techniques. An example of a system for performing motion estimation with efficient block matching is disclosed in U.S. patent application Ser. No. 08/332,828, filing date Oct. 31, 1994, the entirety of which is incorporated herein by reference.

Periodically, a new intra-frame must be sent, for otherwise cumulative errors may build up in the successively compressed and reconstructed video frames. Typically, an intra-frame is transmitted every tenth video frame. Thus, video frame 0 may be encoded and transmitted as an intra-frame, while video frame 1 is encoded relative to video frame 0 with motion estimation encoding; video frame 2 is encoded relative to video frame 1; and so on. Every tenth video frame, i.e. video frames 10, 20, 30 . . . , is transmitted as an intra-frame. It will be understood that other intervals may be selected for sending intra-frames during motion estimation, e.g. every 16th frame. Further, intra-frames may be sent at other times as well, for example at scene changes. If a video processing algorithm detects a scene change from video frame 4 to video frame 5, for example, video frame 5 may be encoded and transmitted as an intra-frame rather than utilizing a difference from frame 4.

In video processing system 100, the automatic exposure settings mechanism of video camera 102 is controlled via strobe signal line 104 by video processor 101 so that the automatic exposure setting mechanism is inactive when motion estimation encoding is to be performed. Hereinafter such encoding may be referred to as difference encoding. The automatic exposure settings are activated only when an intra-frame is to be encoded. Hereinafter such encoding of a video frame, which is often called motion encoding, may be referred to as intra-frame encoding. Thus, each new video frame that is received from video camera 102 that is to be difference encoded is transmitted by video camera 102 with the same exposure settings as the previous video frame to which the current video frame will be compared. It will be appreciated that this method will eliminate the churning problems referred to hereinabove.

Video processing system 100 accomplishes this result through interfacing video processor 101 with video camera 102 via strobe signal line 104. As explained above, video camera 102 contains a programmable gain control that allows video camera 102 to be configured to enable or disable AGC with enable/disable means 120 in response to an input signal from strobe signal line 104. In a preferred embodiment, video camera 102 contains, in general, a programmable exposure control so that an input signal from strobe signal line 104 will either enable or disable all automatic exposure settings.

In a preferred embodiment, video camera 102 is programmed or configured so that it is continually determining new exposure settings based on input video data received, but the new exposure settings are not actually put into effect by video camera 102 until positively instructed to do so by video processor 101 via a strobe signal on strobe signal line 104. When video processor 101 needs to send the next video frame as an intra-frame, before receiving this frame video processor 101 will strobe video camera 102 to allow video camera 102 to put its currently-calculated exposure settings into effect. I.e., video camera 102 is instructed by the strobe signal from video processor 101 to adjust its gain, gamma curves, color balance, automatic focus, etc., as illustrated by automatic exposure settings 130 and individual settings 131–137 of video camera 102 of FIG. 1, just before transmitting an intra-frame to video processor 101. When the new exposure settings are implemented, the previous exposure settings that had been used for the previous 10 frames, i.e. since the last intra-frame, are replaced with the new ones. These new exposure settings will be "frozen" until the next strobe signal indicates that the exposure settings may be adjusted once more, i.e. when the next intra-frame is to be intra-frame encoded. In this manner video processor 101 interfaces with video camera 102 so that they are phase-locked, whereby new exposure parameters are implemented by the camera to adjust video frames only when an intra-frame is transmitted to video processor 101.

It will be appreciated that artifacts may be caused due to changing the exposure settings every intra-frame rather than more smoothly and continuously at each video frame. However, whenever a video frame is encoded and transmitted as an intra-frame—i.e., after intra-frame encoding-there are already artifacts between the previous difference-encoded frame and the next intra-frame. Thus, any artifacts occurring at every intra-frame due to less frequently updating the exposure parameters will largely be absorbed or masked by artifacts that will occur anyway due to the motion estimation technique. Further, typically 30 frames per second are generated by video camera 102 and transmitted to video processor 101, so that intra-frames usually occur several times a second, e.g. every tenth frame. With exposure settings updated this often there is generally adequate scene adaptation response time so that many benefits of automatic exposure setting adjustment are retained.

Further, it will be appreciated that the noise rejection threshold scheme for minimizing the LSB problem as referred to hereinabove may be implemented because the fluctuations caused by automatic exposure settings are eliminated for the difference-encoded video frames.

Figure 2:
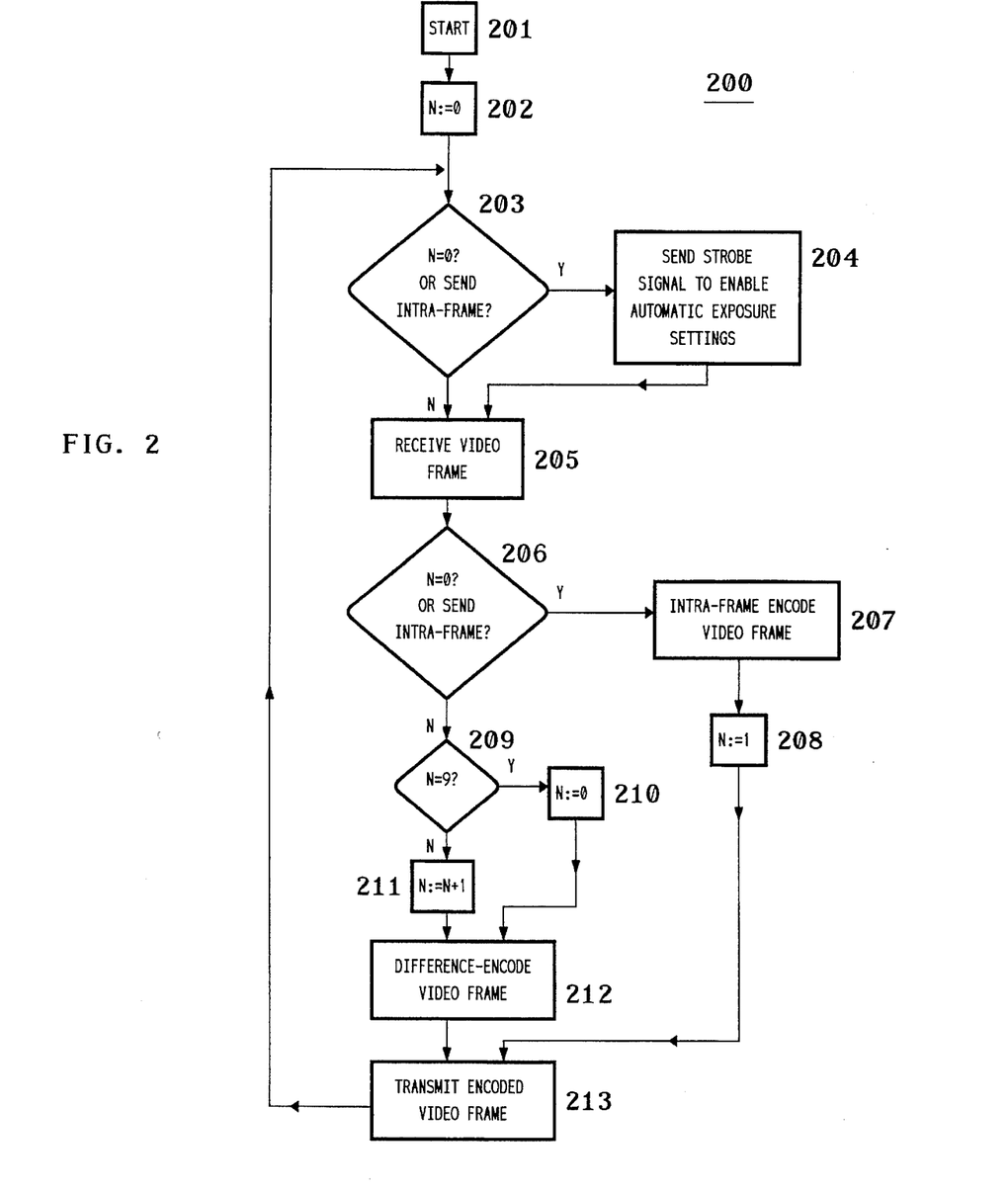
FIG. 2 is a flow chart of the method of operation of the video system of FIG. 1.

Referring now to FIG. 2, there is shown a flow chart of the method of operation of video system 100 of FIG. 1. As illustrated in FIG. 2, the operation of video system 100 starts in steps 201–202. A counter N is initially set to 0 to indicate that a video frame is to be intra-frame encoded (step 202). During the operation of video system 100, if video processor 101 determines that an intra-frame is to be processed by intra-frame determination means 105 of FIG. 1 (in flow chart 200, where N=0 or video processor 101 otherwise indicates that an intra-frame is to be processed, step 203), then video processor 101 will strobe video camera 102 to instruct video camera 102 to adjust its gain, gamma curves, color balance, automatic focus, and other automatic exposure settings (step 204) just before transmitting an intra-frame to video processor 101 (step 205). If, instead, a difference-encoded video frame is to be processed (step 203), the next video frame will be received from video camera 102 without video camera 102 having been strobed to adjust its exposure settings (step 205). Once the latest video frame is received by video processor 101, if the video frame is to be intra-frame encoded it may be encoded with any data compression techniques other than difference encoding (step 207), and counter N is set to 1 (step 208) to indicate for the next loop that the previous video frame processed was intra-frame encoded. After intra-frame encoding, the intra-frame encoded video frame is transmitted, for example to a remote receiving video processor (110) (step 213).

If, instead, N<>0 and video processor 101 does not otherwise determine that the just-received video frame is to be intra-frame encoded (step 206), then the counter N is incremented if N<9, or set to 0 if N=9, so that the next loop will either request an intra-frame or not, as appropriate (steps 209, 210, 211). The video frame is then difference encoded according to motion estimation techniques (step 212). After the video frame has either been difference encoded (step 212) or intra-frame encoded (step 207), the encoded video frame may be transmitted, for example to a remote receiving video processing node (not shown) (step 213).

It will be appreciated by those skilled in the art that video camera 102 may also be an analog video camera with automatic exposure settings. In this case the camera must be configured with an enable/disable strobe input so that the parameters calculated by the automatic exposure mechanism are not put into effect except in response to a strobe signal from video processor 101, which will be transmitted before each intra-frame as described hereinabove.

It will further be appreciated that, in alternative preferred embodiments, the strobe signal may also contain actual exposure parameters to be enacted by video camera 102. For example, based on previous video frames, video processor 101 may determine which exposure parameters are desired for subsequent video frames and download this information to video camera 102's programmable exposure control.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for processing video signals, comprising the steps of:

(a) providing a video processor means;

(b) providing a video camera means interfaced with the video processor means and for supplying video frames to the video processor means, the video camera means comprising:

automatic exposure setting means for automatically updating at least one video exposure parameter before transmitting a next video frame to the video processor means; and means for enabling or disabling the automatic exposure setting means in response to a strobe signal;

(c) determining with the video processor means whether to intra-frame encode or to difference encode the next video frame; and (d) transmitting the strobe signal from the video processor means to the video camera means in accordance with the determining of step (c) to control the automatic exposure setting means of the video camera means.

2. The method of claim 1, wherein:

the means for enabling or disabling the automatic exposure setting means enables the automatic exposure setting means upon receipt of the strobe signal and disables the automatic exposure setting means otherwise; and step (d) comprises the step of transmitting the strobe signal from the video processor means to the video camera means to enable the automatic exposure setting means of the video camera means if it is determined in step (c) to intra-frame encode the next video frame, whereby the automatic exposure means automatically updates at least one video exposure parameter.

3. The method of claim 2, wherein the at least one video exposure parameter comprises a plurality of video exposure parameters comprising gain, gamma curves, color balance, focus, wipeout, fade, and zoom parameters.

4. The method of claim 3, wherein the automatic exposure setting means continuously determines the plurality of video exposure parameters.

5. The method of claim 2, wherein the automatic exposure setting means comprises automatic gain control means.

6. The method of claim 5, wherein the automatic exposure setting means further comprises automatic gamma curve adjustment means, automatic color balance means, automatic focus means, automatic wipeout means, automatic fade means, and automatic zoom means.

7. The method of claim 2, wherein the automatic exposure setting means continuously determines the at least one video exposure parameter.

8. The method of claim 2, further comprising the steps of:

(e) transmitting the next video frame from the video camera means to the video processor means after both steps (c) and (d); and (f) either intra-frame encoding or difference frame encoding the next video frame with the video processor means in accordance with the determining of step (c).

9. The method of claim 8, further comprising the step of:

(g) transmitting the next video frame after the encoding of step (f) to a remote video processor.

10. The method of claim 2, wherein:

the video processor means comprises a video processor; and the video camera means comprises a video camera.

11. The method of claim 10, wherein the video camera comprises a digital video camera.

12. The method of claim 10, wherein the video camera comprises an analog video camera.

13. The method of claim 2, wherein step (c) comprises the step of determining to intra-frame encode the next video frame if the next video frame is the initial video frame to be processed by the video processing means of a plurality of consecutive video frames or if a predetermined number of previous consecutive video frames processed by the video processing means have been difference encoded.

14. The method of claim 13, wherein the predetermined number is nine.

15. An apparatus for processing video signals, comprising:

(a) video processor means; and (b) video camera means interfaced with the video processor means and for supplying video frames to the video processor means, the video camera means comprising:

automatic exposure setting means for automatically updating at least one video exposure parameter before transmitting a next video frame to the video processor means; and means for enabling or disabling the automatic exposure setting means in response to a strobe signal;

the video processor means comprising means for determining whether to intra-frame encode or to difference encode the next video frame;

wherein the video processor means comprises means for transmitting the strobe signal to the video camera means in accordance with the means for determining to control the automatic exposure setting means of the video camera means.

16. The apparatus of claim 15, wherein:

the means for enabling or disabling the automatic exposure setting means enables the automatic exposure setting means upon receipt of the strobe signal and disables the automatic exposure setting means otherwise; and the means for transmitting the strobe signal comprises means for transmitting the strobe signal from the video processor means to the video camera means to enable the automatic exposure setting means of the video camera means if it is determined by the determining means to intra-frame encode the next video frame, whereby the automatic exposure means automatically updates at least one video exposure parameter.

17. The apparatus of claim 16, wherein the at least one video exposure parameter comprises a plurality of video exposure parameters comprising gain, gamma curves, color balance, focus, wipeout, fade, and zoom parameters.

18. The apparatus of claim 17, wherein the automatic exposure setting means continuously determines the plurality of video exposure parameters.

19. The apparatus of claim 16, wherein the automatic exposure setting means comprises automatic gain control means.

20. The apparatus of claim 19, wherein the automatic exposure setting means further comprises automatic gamma curve adjustment means, automatic color balance means, automatic focus means, automatic wipeout means, automatic fade means, and automatic zoom means.

21. The apparatus of claim 16, wherein the automatic exposure setting means continuously determines the at least one video exposure parameter.

22. The apparatus of claim 16, wherein:

the video camera means comprises means for transmitting the next video frame to the video processor means after reception of the strobe signal; and the video processor means comprises means for intra-frame encoding or difference frame encoding the next video frame in accordance with the means for determining.

23. The apparatus of claim 22, further comprising means for transmitting the encoded next video frame to a remote video processor after the encoding of the means for intra-frame encoding or difference frame encoding the next video frame.

24. The apparatus of claim 16, wherein:

the video processor means comprises a video processor; and the video camera means comprises a video camera.

25. The apparatus of claim 24, wherein the video camera comprises a digital video camera.

26. The apparatus of claim 24, wherein the video camera comprises an analog video camera.

27. The apparatus of claim 16, wherein the determining means determines to intra-frame encode the next video frame if the next video frame is the initial video frame to be processed by the video processing means of a plurality of consecutive video frames or if a predetermined number of previous consecutive video frames processed by the video processing means have been difference encoded.

28. The apparatus of claim 27, wherein the predetermined number is nine.

* * * * *

UNITED STATES PATENT AND TRADEMARK OFFICE
CERTIFICATE OF CORRECTION

PATENT NO.    :    5,550,595
DATED         :    August 27, 1996
INVENTOR(S)   :    Eric C. Hannah It is certified that error appears in the above-identified patent and that said Letters Patent is hereby corrected as shown below:

In the Drawings, Sheet 1, delete "Figure 1 in its entirety" and insert therefor the drawing on the following page:

The title page showing the illustrative figure should be deleted and substitute therefor the attached title page.

Signed and Sealed this

Seventh Day of March, 2000

Attest:

Attesting Officer

Q. TODD DICKINSON

*Commissioner of Patents and Trademarks*

United States Patent [19]

Hannah

[11] Patent Number: 5,550,595
[45] Date of Patent: Aug. 27, 1996

[54] APPARATUS AND METHOD FOR MOTION ESTIMATION WITH ENHANCED CAMERA INTERFACE

[75] Inventor: Eric C. Hannah, Pebble Beach, Calif.

[73] Assignee: Intel Corporation, Santa Clara, Calif.

[21] Appl. No.: 357,389

[22] Filed: Dec. 16, 1994

[51] Int. Cl.⁶ ............................. H04N 7/24; H04N 7/32; H04N 5/765
[52] U.S. Cl. .................. 348/552; 348/384; 348/222; 348/229; 348/364; 348/371
[58] Field of Search ............................. 348/552, 409, 348/415, 416, 384, 207, 229, 222, 221, 362, 364, 371; H04N 7/24, 7/32, 5/765

[56] References Cited

U.S. PATENT DOCUMENTS

| | | | |
|---|---|---|---|
| 4,849,810 | 7/1989 | Ericsson | 358/135 |
| 5,016,107 | 5/1991 | Sasson et al. | 348/384 |
| 5,019,901 | 5/1991 | Uomori et al. | 358/105 |
| 5,126,841 | 6/1992 | Tanaka et al. | 358/105 |
| 5,150,209 | 9/1992 | Baker | 358/135 |
| 5,151,784 | 9/1992 | Lavagetto et al. | 358/136 |
| 5,173,773 | 12/1992 | Ueda et al. | 358/136 |
| 5,198,901 | 3/1994 | Lynch | 358/138 |
| 5,251,028 | 10/1993 | Iu | 358/133 |
| 5,329,318 | 7/1994 | Keith | 348/699 |
| 5,414,464 | 5/1995 | Sasaki | 348/222 |
| 5,416,520 | 5/1995 | Kuzma | 348/409 |
| 5,436,666 | 7/1995 | Astle | 348/416 |

*Primary Examiner*—Safet Metjahic
*Assistant Examiner*—Glenton B. Burgess
*Attorney, Agent, or Firm*—William H. Murray; N. Stephan Kinsella

[57] ABSTRACT

A method and apparatus for processing video signals. According to a preferred embodiment, a video processor is provided, and a video camera interfaced with with the video processor is provided. The video camera supplies video frames to the video processor, and comprises an automatic exposure setting mechanism for automatically updating at least one video exposure parameter before transmitting a next video frame to the video processor. The video camera enables or disables the automatic exposure setting mechanism in response to a strobe signal. It is determined whether to intra-frame encode or to difference encode the next video frame. The video processor transmits a strobe signal to the video camera in accordance with this determination to control the automatic exposure setting mechanism of the video camera.

28 Claims, 2 Drawing Sheets

FIG. 1

UNITED STATES PATENT AND TRADEMARK OFFICE
CERTIFICATE OF CORRECTION

PATENT NO. : 5,550,595                    Page 3 of 3

DATED : August 27, 1996

INVENTOR(S) : Eric C. Hannah

It is certified that error appears in the above-identified patent and that said Letters Patent is hereby corrected as shown below:

FIG. 1